(12) United States Patent
Harkness et al.

(10) Patent No.: US 10,014,083 B2
(45) Date of Patent: Jul. 3, 2018

(54) METHOD OF REFUELING A NUCLEAR REACTOR

(75) Inventors: Alexander W. Harkness, Gibsonia, PA (US); William Edward Cummins, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1802 days.

(21) Appl. No.: 13/461,821

(22) Filed: May 2, 2012

(65) Prior Publication Data

US 2013/0294565 A1   Nov. 7, 2013

(51) Int. Cl.
G21C 19/00 (2006.01)
G21C 19/20 (2006.01)
G21C 11/02 (2006.01)
G21F 7/015 (2006.01)

(52) U.S. Cl.
CPC ............ G21C 19/20 (2013.01); G21C 11/022 (2013.01); G21F 7/015 (2013.01); Y02E 30/40 (2013.01)

(58) Field of Classification Search
CPC ......... G21C 19/20; G21C 19/22; G21C 19/24
USPC .................................................. 376/264, 267
See application file for complete search history.

(56) References Cited

U.S. PATENT DOCUMENTS

| | | | |
|---|---|---|---|
| 4,096,031 A | 6/1978 | Wade | |
| 4,158,599 A | 6/1979 | Andrews et al. | |
| 4,647,423 A | 3/1987 | Hawke | |
| 5,037,604 A * | 8/1991 | Bauer et al. | 376/260 |
| 5,075,070 A * | 12/1991 | Costes | 376/293 |
| 5,896,430 A | 4/1999 | Bäversten et al. | |
| 5,970,109 A | 10/1999 | Meier-Hynek et al. | |
| 7,668,281 B2 * | 2/2010 | Balog et al. | 376/260 |
| 2009/0285345 A1 | 11/2009 | Balog et al. | |
| 2009/0323883 A1 | 12/2009 | Aoki | |

FOREIGN PATENT DOCUMENTS

| | | |
|---|---|---|
| CN | 1112718 | 11/1995 |
| CN | 1790552 | 6/2006 |
| CN | 101154472 | 4/2008 |
| EP | 0806778 | 12/1997 |

(Continued)

OTHER PUBLICATIONS

"The Westinghouse Pressurized Water Reactor Nuclear Power Plant," (c) 1984.*

(Continued)

*Primary Examiner* — Jack W Keith
(74) *Attorney, Agent, or Firm* — Joseph C. Spadacene; Westinghouse Electric Company LLC

(57) ABSTRACT

A method of refueling a nuclear reactor that includes the steps of removing the reactor vessel head and upper internals to a storage location and installing a cylindrical tank having open upper and lower ends, on the reactor vessel flange. The cylindrical tank is sealed to the reactor vessel and a penetration on the side of the cylindrical tank is sealed to a refueling canal that is connected to a spent fuel pool. The level of reactor coolant within the reactor vessel is then raised to at least partially fill the cylindrical tank to a level equal to that of the spent fuel pool. The refueling canal is then opened and a refueling machine supported on the reactor vessel is employed to transfer fuel assemblies between the core and the spent fuel pool.

11 Claims, 8 Drawing Sheets

(56) References Cited

FOREIGN PATENT DOCUMENTS

| | | |
|---|---|---|
| JP | S59176697 | 10/1984 |
| JP | S62185198 | 8/1987 |
| JP | S63-105899 | 7/1988 |

OTHER PUBLICATIONS

International Search Report for PCT/US2013/036059 dated Sep. 30, 2013 (Form PCT/ISA/210).
Written Opinion of the International Searching Authority for PCT/US2013/036059 dated Sep. 30, 2013 (Form PCT/ISA/237).
Westinghouse Electric Corporation, Water Reactor Divisions, "the westinghouse pressurized water reactor nuclear power plant," 1984, 11 pages.
International Preliminary Report on Patentability for PCT/US2013/036059 dated Nov. 13, 2014 (Forms PCT/IB/326, PCT/IB/373, PCT/ISA/237).

\* cited by examiner

METHOD OF REFUELING A NUCLEAR REACTOR

BACKGROUND

1. Field

This invention relates generally to a method for refueling a nuclear reactor, and in particular, to a method of refueling a small modular reactor with a compact containment vessel.

2. Related Art

Nuclear power plants which employ light water reactors require periodic outages for refueling of the reactor. New fuel assemblies are delivered to the plant and are temporarily stored in a fuel storage building, along with used fuel assemblies which may have been previously removed from the reactor. During a refueling outage, a portion of the fuel assemblies in the reactor are removed from the reactor to the fuel storage building. A second portion of the fuel assemblies are moved from one support location in the reactor to another core support location in the reactor. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer.

Refueling activities are often on the critical path for returning the nuclear plant to power operation, therefore the speed of these operations is an important economic consideration for the power plant owner. Furthermore, the plant equipment and fuel assemblies are expensive and care must be taken not to cause damage or unnecessary radiation exposure due to improper handling of the fuel assemblies or fuel transfer equipment. The precision of these operations is also important since the safe and economical operation of the reactor core depends upon each fuel assembly being in its proper location.

The typical pressurized water reactor needs to be refueled every eighteen to twenty-four months. During refueling, the reactor is disassembled and the core is off-loaded into the storage location typically known as a spent fuel pool. In a traditional pressurized water reactor, fuel is accessed by removing the reactor vessel closure head and upper internals. These components are stored within the containment building while a specialized refueling crane, supported from an operating deck above the reactor vessel flange, moves fuel assemblies one at a time from the reactor vessel to a fuel transfer canal. The transfer canal connects the spent fuel storage area of the plant to the reactor containment building. The fuel is downended (laid on its side) before it is moved through the transfer canal. The process is reversed to load the fuel back into the reactor vessel. The physical configuration of some pressurized water reactor designs, including an integral reactor being developed for small modular reactor plants, prevents this traditional approach to refueling from being applied directly.

FIGS. 1 and 2 illustrate such a small modular reactor. FIG. 1 shows a perspective view of the reactor containment, partially cut away, to show the pressure vessel and its internal components. FIG. 2 is an enlarged view of the pressure vessel shown in FIG. 1. The pressurizer 22 is integrated into the upper portion of the reactor vessel head 28 and eliminates the need for a separate component. A hot leg riser 16 directs primary coolant from the core 14 to a steam generator 18 which surrounds the hot leg riser 16. A number of coolant pumps 26 are circumferentially spaced around the reactor vessel 10 at an elevation near the upper end of the upper internals 24. The reactor coolant pumps 26 are horizontally mounted axial flow canned motor pumps. The reactor core 14 and the upper internals 24, except for their size, are substantially the same as the corresponding components in an AP1000® reactor, offered by Westinghouse Electric Company LLC, Cranberry Twp., Pa. From the foregoing, it should be apparent that employing the traditional refueling method by flooding the reactor well above the area of the vessel flange 30 and transferring the fuel assemblies under water to a spent fuel pool by way of a transfer canal 32 that extends through the containment would not be practical with this type of containment and compact design.

Accordingly, a new refueling method is desired that can accommodate compact, integral reactor designs.

Furthermore, such a method is desired that can refuel such a compact containment and integral reactor design efficiently without damaging the transferred components or causing unnecessary radiation exposure.

SUMMARY

These and other objects are achieved by a method of refueling a nuclear reactor comprising a reactor vessel having an open upper end with a flange; the reactor vessel housing a core including a plurality of fuel assemblies and an upper internal structure supported above the core. A reactor vessel head with a mating flange seals off the open upper end of the reactor vessel. The refueling method comprises the steps of removing the reactor vessel head and placing the head in a first storage location outside of a path above the reactor vessel. The upper internals structure is then lifted out of the reactor vessel to a second storage location outside of the path above the reactor vessel. A cylindrical tank having an open lower end and an open upper end is installed on the reactor vessel flange and the lower end of the cylindrical tank is then sealed to the reactor vessel flange. A penetration on the side of the cylindrical tank is connected to a refueling canal that communicates the inside of the containment to a spent fuel pool outside of the containment and within the reactor building. The level of reactor coolant within the reactor vessel is raised to at least partially fill the cylindrical tank substantially to a level equal to a level of a coolant within the spent fuel pool. The refueling canal is then opened and a refueling machine supported above the cylindrical tank is employed to transfer a number of the fuel assemblies from the core and through the penetration and the refueling canal to a storage location in the spent fuel pool.

In one embodiment, the step of lifting the upper internals structure includes the steps of lowering a radiation shield within the cylindrical tank, above the upper internals structure. The upper internals structure is then raised within the radiation shield and the radiation shield with the upper internals structure inside is lifted and moved to a second storage location. Preferably, the step of lifting the upper internals structure further includes the step of lowering the upper internals structure from the radiation shield to a shielded stand at the second storage location. Desirably, the shielded stand is located in a pool of coolant. In another embodiment, air is drawn into the radiation shield, filtered before it is exhausted from the radiation shield and exhausted from the radiation shield after it has been filtered.

Additionally, the step of lifting the upper internals structure may include using the reactor building main crane for that purpose.

Further, the method may include the step of supporting the refueling machine from the reactor vessel and preferably from above the cylindrical tank. The method may also include the step of indexing the refueling machine off of the reactor flange to locate the fuel assemblies to be moved.

Preferably, the step of raising the level of reactor coolant is accomplished with an existing reactor vessel penetration and the cylindrical tank is sealed to the reactor vessel flange.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
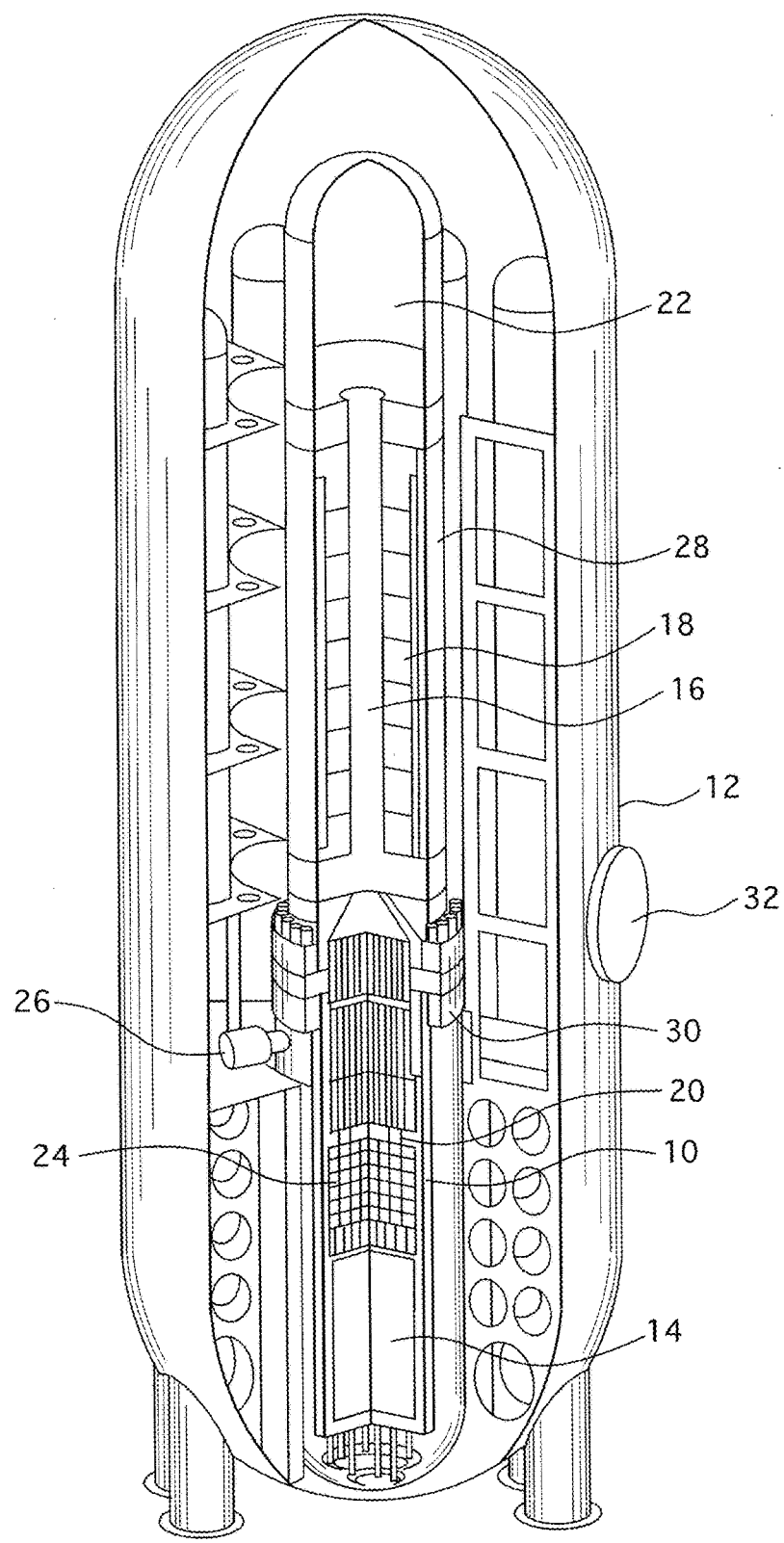
FIG. 1 is a perspective view, partially cut away, showing a small modular reactor system.
Figure 2:
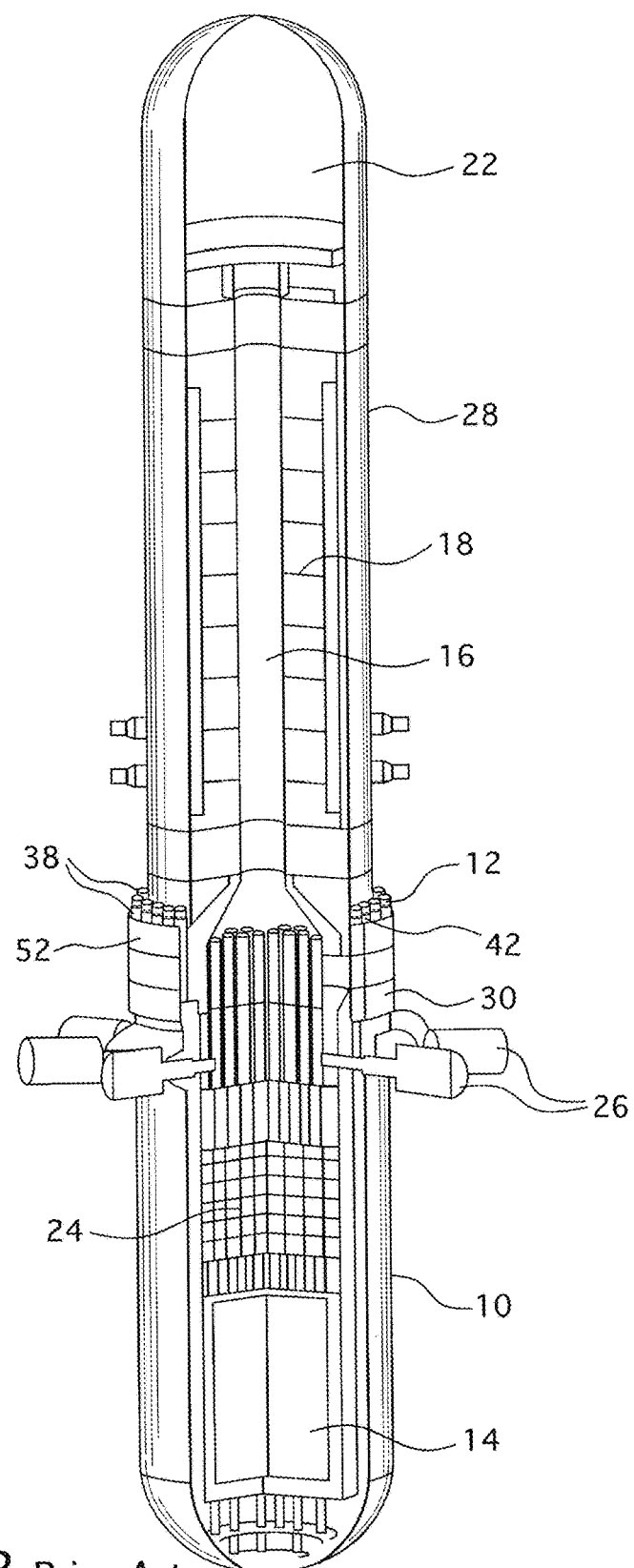
FIG. 2 is an enlarged view of the reactor shown in FIG. 1.

The steps of this embodiment are sequentially illustrated in FIGS. 3-14. This embodiment uses a temporarily installed refueling machine 36 attached directly to the reactor vessel 10. The machine 36 can use the reactor vessel stud holes 38 or a similar feature to secure and align itself to the reactor vessel 10. The machine preferably includes a shielded tank 40 that is open at the top and bottom. The tank seals to the flange 30 of the reactor 10 by contacting the mating surface of the vessel. An O-ring or similar soft seal can be used to limit leakage. Pressure applied to make the seal is either provided by the weight of the tank or by mechanical fasteners such as the studs 42. Any leakage would be detected by the existing reactor vessel leak-off lines provided between the O-ring seals used to seal the reactor vessel during plant operation. The tank 40 has a penetration 44 perpendicular to the center line of the tank. This penetration provides a means of transferring the fuel assemblies in the core 14 from the reactor vessel 10 to a fuel storage area, i.e., the spent fuel pool 46 of the plant. This penetration forms at least part of the fuel transfer canal 48. The temporary refueling machine assembly 36 with its tank 40 and penetration 44 are lowered onto the reactor vessel 10 using the reactor building main crane 50 after the closure flange 52 on the reactor vessel head 28 and the upper internals 24 have been removed from the reactor vessel 10 to provide access to the fuel assemblies in the core 14. In the case of many integral reactor designs, the steam generator 18, pressurizer assembly 22 and upper internals are removed from the reactor vessel to gain access to the fuel. The tank penetration 44 is connected to a mating penetration 32 in the containment vessel 12 that communicates with the spent fuel pool 46. The water level in the temporary tank 40 is then raised by introducing additional water inventory to the reactor vessel through an existing reactor penetration such as the chemical and volume control system penetration. When the water level in the temporary tank 40 is substantially even with the water level in the spent fuel pool 46, the transfer canal 48 can be opened to allow fuel to be passed from the reactor to the spent fuel pool. A transfer cart 54 is used to move the fuel through the transfer canal 48. The cart 54 is extended through the canal to the reactor vessel to accept the fuel assembly from a temporary refueling machine 56 which is supported on top of the shielded tank 40. As in traditional plants, the cart 54 has a rotating basket to allow the fuel assembly to be downended, i.e., rotated to a horizontal position, to minimize the required diameter needed for the transfer canal. Once the cart 54 has passed from the reactor vessel 10 to the spent fuel pool area 46, the basket is upended again and a traditional fuel handling machine 58 removes the fuel from the cart. This traditional fuel handling machine 58 places the fuel into a temporary storage rack 60 until it can be transferred to dry storage or a reprocessing facility.

Thus, this invention addresses a number of design challenges associated with integral pressurized water reactors and small modular reactors. The compact high pressure containment vessels 12 such as the one shown in FIG. 1, used in the design of small modular reactors, do not have room to include a refueling pool above the vessel which is typical for traditional operating pressurized water reactors. It is not possible to fill the containment vessel with water during refueling due to contamination concerns and sensitive equipment within the containment that cannot be designed for submergence. Instead, in accordance with the foregoing embodiment, a temporary refueling pool is provided by securing a tank to the reactor vessel that seals to the reactor vessel flange mating surface. The water within the temporary tank 40 provides shielding and is a filter should a fuel element leak develop. The tank 40 itself (including the structure of the transfer canal) provides additional shielding due to the thickness of the wall material.

Since the containment vessel cannot be filled with water, the upper internals 24 cannot remain under water during removal to storage. A specifically designed lifting rig that is both shielded and positively vented is used to remove the upper internals 24 from the reactor vessel 10. A shielding bell 64 fits over a flange on the upper internals and a portion of the lifting rig structure passes through holes in the shielding bell to engage the features provided on the upper internals for lifting. To prevent airborne contamination, a combination of fan and HEPA filter draw air into the shielding bell 64 from the bottom and filter the air in the bell before it is discharged. The lifting rig 62 is used to place the upper internals in a shielded stand in the reactor building outside of the containment 12. The internals may be shielded in the storage location by being submerged in water or borated water.

The distance between the reactor building operating deck and the fuel assemblies in the core 14 is much larger in small modular reactor designs than is experienced in conventional pressurized water reactor plants. Modifications to traditional refueling machines to operate at such a distance would not be practical due to dimensional control, ability to monitor visually and seismic considerations. This embodiment secures a temporary refueling machine 56 to the reactor flange which moves the machine much closer to the reactor core. The fuel is raised into a mask 70, traveling a distance similar to that of a traditional refueling machine. The reactor vessel provides a very stable attachment point that is indexed to the fuel allowing for precise alignment.

Figure 3:
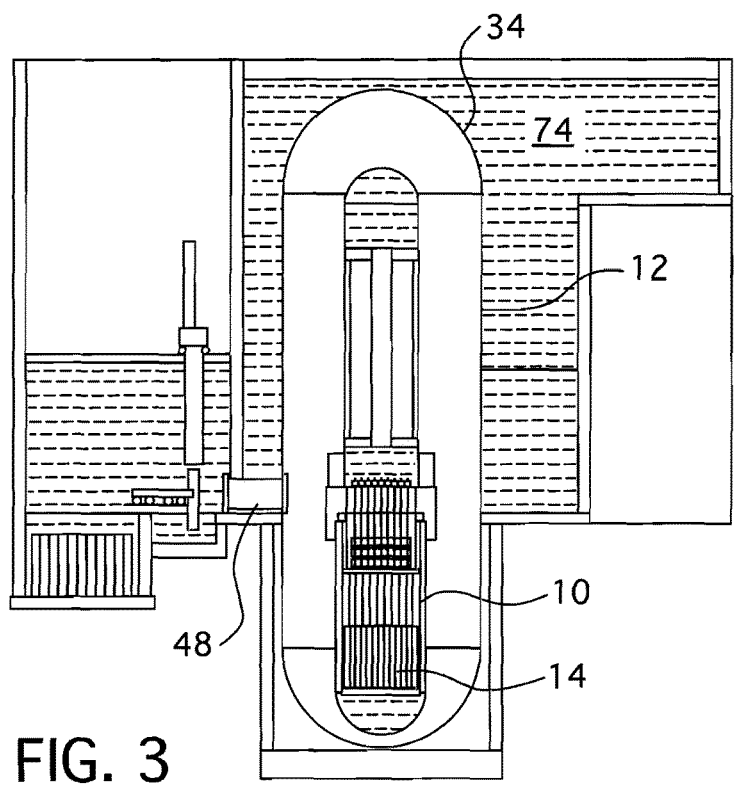
FIGS. 3-14 are schematic views of the inside of a reactor building progressively showing the steps of the embodiments of the methods described hereafter.
Figure 4:
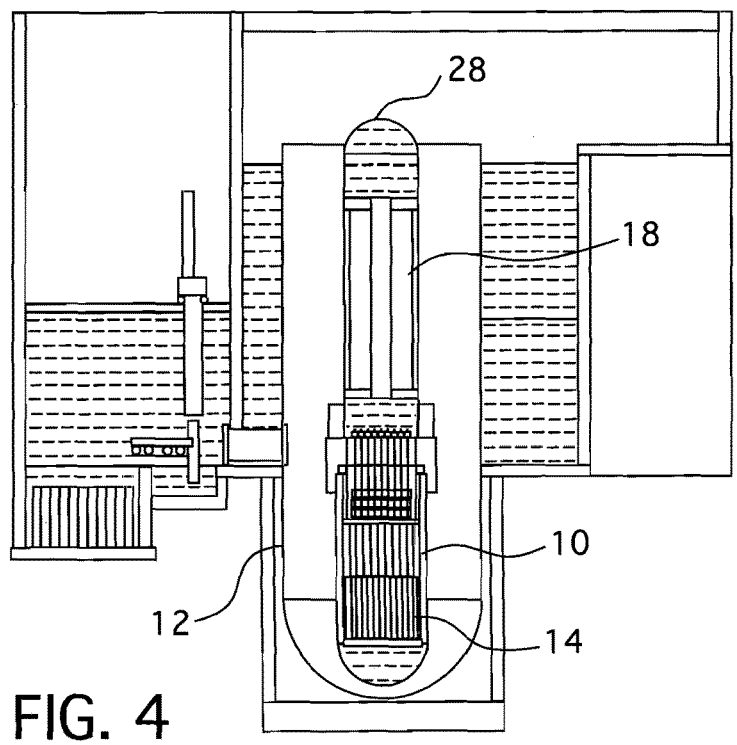
Figure 5:
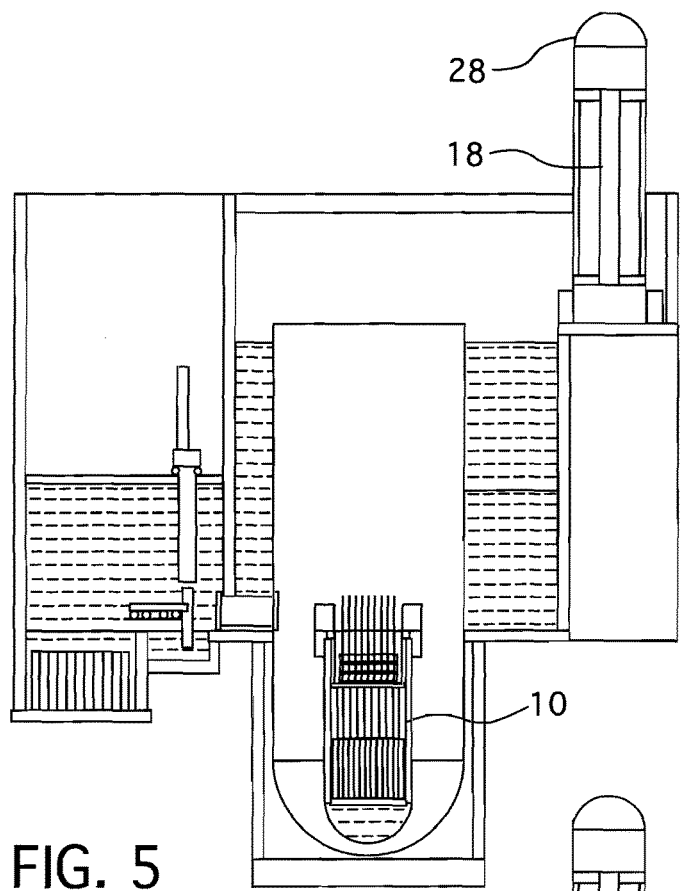
Figure 6:
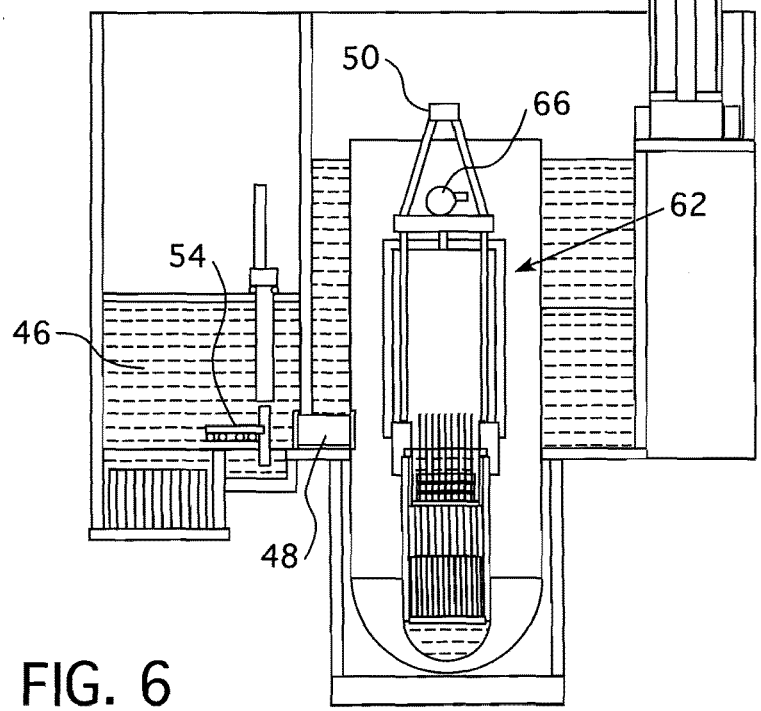
Figure 7:
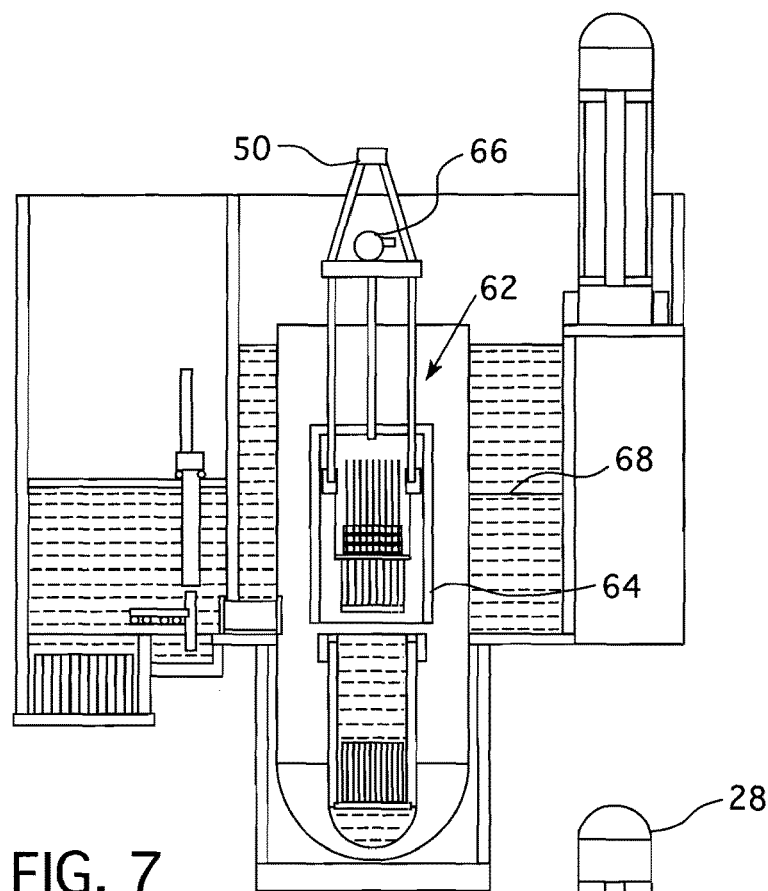
Figure 8:
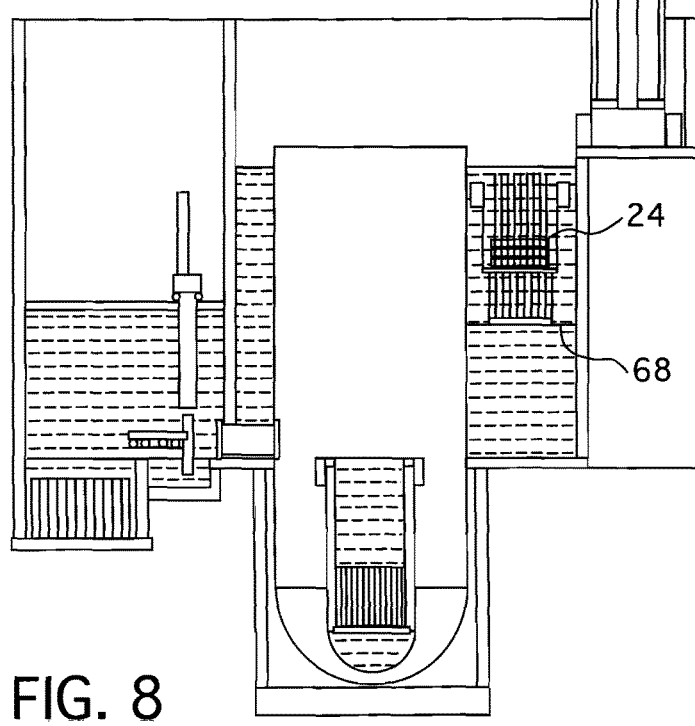
Figure 9:
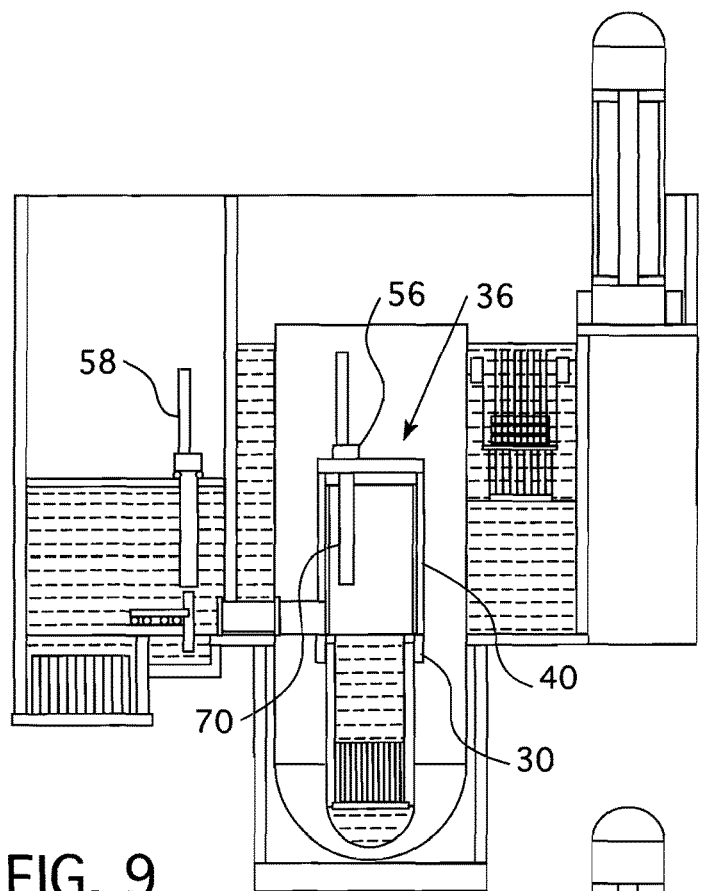
Figure 10:
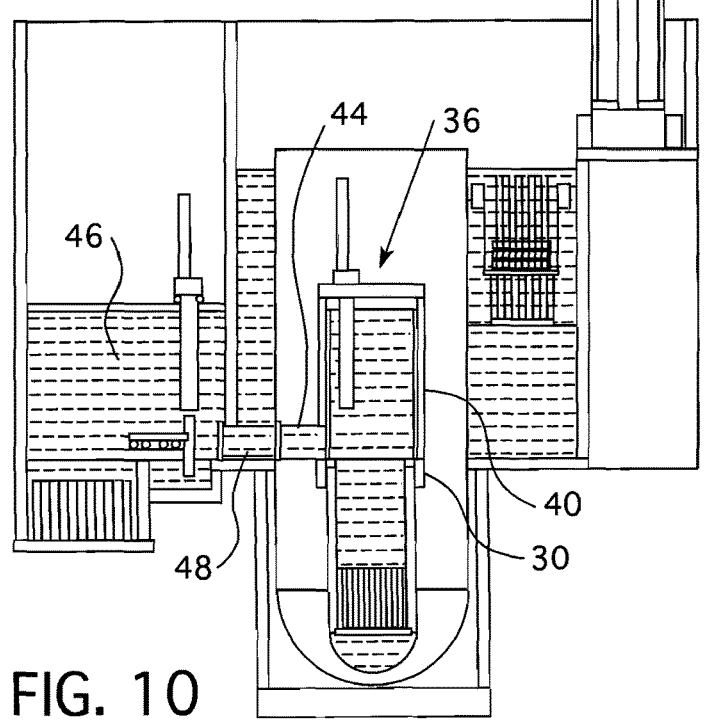
Figure 11:
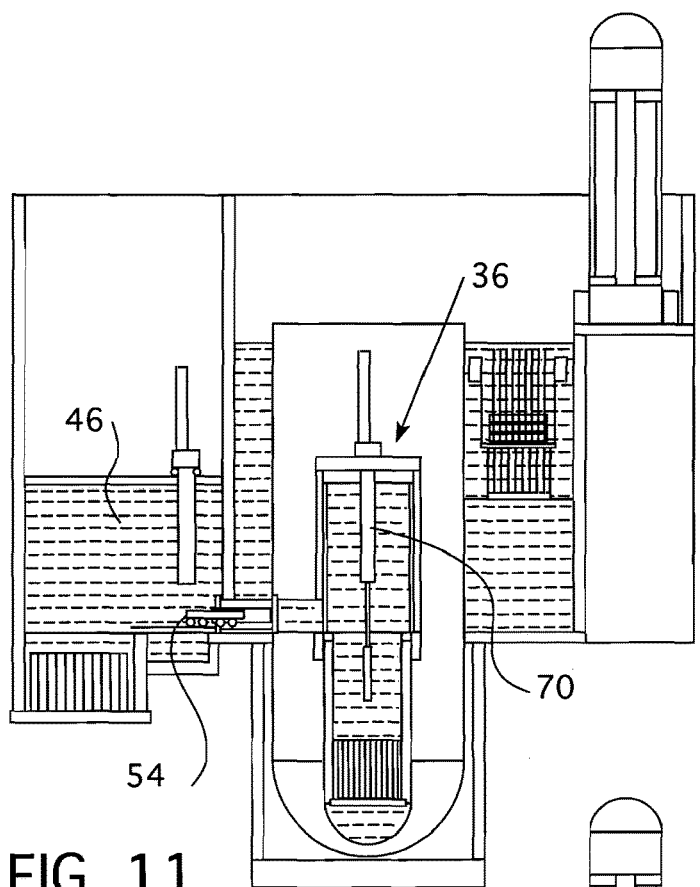
Figure 12:
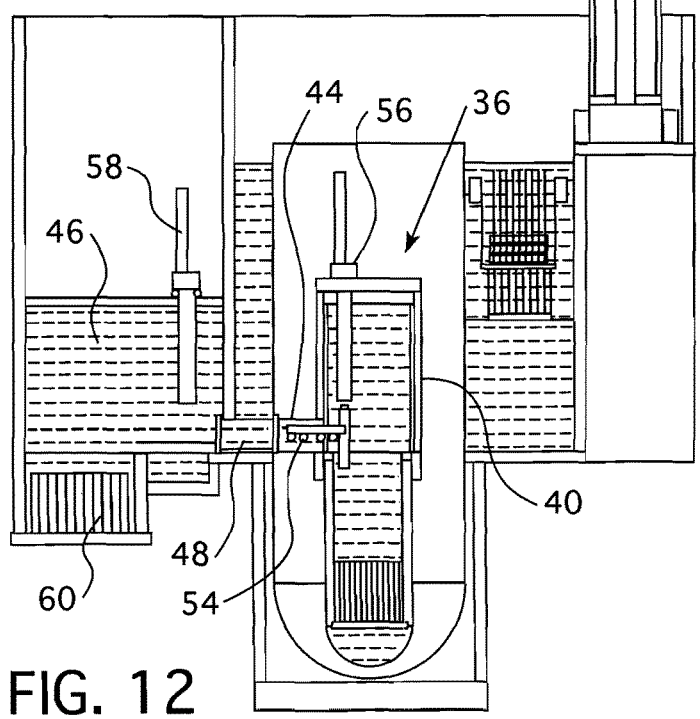
Figure 13:
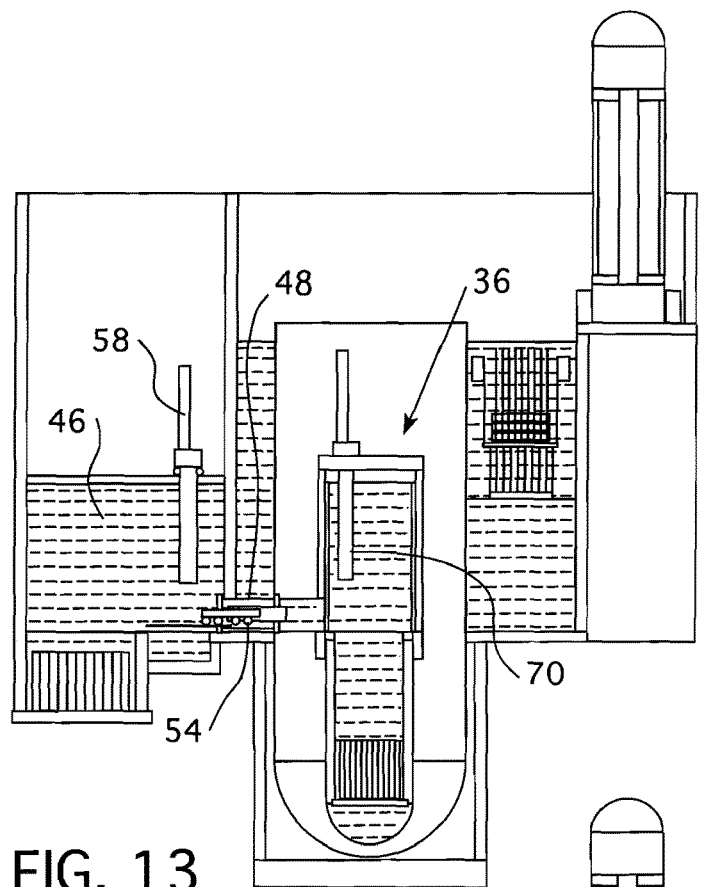
Figure 14:
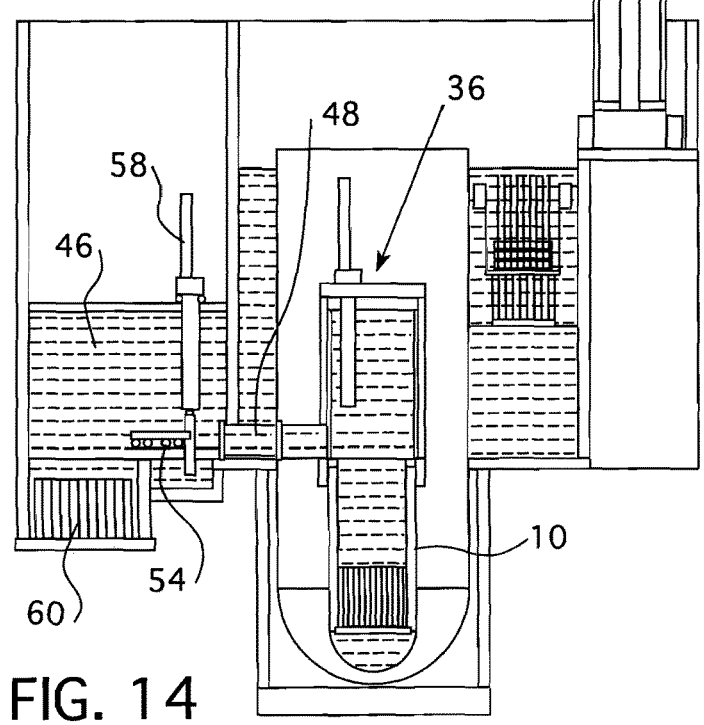

FIGS. 3 through 14 are schematics of a reactor plant sequentially showing the different stages of the refueling method described heretofore. FIG. 3 shows a small modular reactor plant with a compact containment 12 during normal operation. For refueling externally flooded plant building containments, the flooded area figuratively represented by the area 74 in FIG. 3, the water level is first lowered and the upper portion 34 of the containment vessel 12 is removed and stored which opens the containment 12 as shown in FIG. 4. The reactor head 28, containing the steam generator 18 and pressurizer 22, is then removed using the main building crane and stored off to the side of the reactor building as illustrated in FIG. 5. The shielded upper internals lifting rig 62 is lowered into place with the reactor building main crane 50 and secured to the upper internals 24. As shown in FIG. 6, the upper internals 24 are drawn up into the shielded bell 64 of the upper internals lifting rig 62. During the lift, the fan and HEPA filter 66 prevent airborne contamination from being released into the containment building atmosphere. The upper internals are then placed into the upper internals storage stand 68 as shown in FIG. 8. A temporarily installed refueling machine 36 is then attached to the reactor vessel flange 30 as shown in FIG. 9. The shielded tank 40, which is part of the temporarily installed refueling machine 36, is sealed to the reactor vessel flange 30 at the mating surface and is attached to the transfer canal 48. The water level in the tank 40 is then raised to substantially the level of the spent fuel pool 46 using an existing reactor penetration as shown in FIG. 10. The fuel transfer cart 54 travels through the transfer canal 48 as fuel is being raised in the mast 70 of the temporary refueling machine 36 as shown in FIG. 11. A basket on the fuel transfer cart 54 is rotated and fuel is placed into the basket as shown in FIG. 12. The basket is then rotated to a horizontal position and the fuel downended as it enters the transfer canal 48 as shown in FIG. 13. After passing through the transfer canal 48, the basket is rotated back to a vertical position and the fuel is removed by the spent fuel handling machine 58 and placed into temporary storage racks 60 as shown in FIG. 14. The process is repeated as required to remove fuel from the reactor vessel 10. The process is reversed to bring fuel from the spent fuel pool 46 to the reactor vessel 10.

When refueling the core has been completed the transfer canal 48 can be closed and the water level within the temporary refueling machine 36 can be lowered to within the reactor vessel 10 and the temporary refueling machine 36 can be removed by the main building crane to a storage location. The shielded upper internals lifting rig can then be used to raise the internals into the bell and lowered into the core. After the internals are secured the main building crane can be used to replace the reactor head 28 on the vessel 10 and the top of the containment 34 can then be restored to prepare the reactor system for operation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of refueling a nuclear reactor comprising a reactor vessel having an open upper end with a flange, the reactor vessel housing a core including a plurality of fuel assemblies and an upper internals structure supported above the core, and a head with a mating flange for sealing the open upper end of the reactor vessel; the method comprising the steps of:

removing the reactor vessel head;
   placing the reactor vessel head in a first storage location outside of a path above the reactor vessel;
   lifting the upper internals structure out of the reactor vessel to a second storage location outside of the path above the reactor vessel;
   detachably installing a cylindrical tank having an open lower end and an open upper end, on the reactor vessel flange so that the reactor vessel flange substantially supports the cylindrical tank;
   detachably sealing the lower end of the cylindrical tank to the reactor vessel and a penetration on a side of the cylindrical tank to a refueling canal that is connected to a spent fuel pool;
   raising a level of reactor coolant within the reactor vessel to at least partially fill the cylindrical tank substantially to a level equal to a level of a coolant within the spent fuel pool;
   opening the refueling canal; and
   employing a refueling machine at least in part supported above the cylindrical tank, to transfer a number of the fuel assemblies within the core, through the penetration and the refueling canal to a storage location in the spent fuel pool.

2. The method of claim 1 wherein the step of lifting the upper internals structure includes the steps of:
   supporting a radiation shield in the form of an shielded bell with an open lower end, above the open upper end of the reactor vessel;
   lowering the radiation shield substantially to the reactor vessel flange over at least a portion of the upper internals structure;
   raising the upper internals structure within the radiation shield; and
   lifting the radiation shield with the upper internals structure inside to the second storage location.

3. The method of claim 2 including the step of lowering the upper internals structure from the radiation shield to a shielded stand at the second storage location.

4. The method of claim 3 wherein the shielded stand is located in a pool of coolant.

5. The method of claim 2 including the steps of:
   drawing air into the radiation shield;
   filtering the air before it is exhausted from the radiation shield; and
   exhausting the air in the radiation shield after it has been filtered.

6. The method of claim 2 wherein the step of lifting the upper internals structure is accomplished with a reactor building main crane.

7. The method of claim 1 including the step of supporting the refueling machine from the reactor vessel.

8. The method of claim 7 including the step of supporting the refueling machine from the top of the cylindrical tank.

9. The method of claim 7 including the step of indexing the refueling machine off of the reactor flange to locate the fuel assemblies to be removed.

10. The method of claim 1 wherein the step of raising the level of reactor coolant is accomplished with an existing reactor vessel penetration.

11. The method of claim 1 wherein the step of sealing the lower end of the cylindrical tank is sealed to the reactor vessel flange.

* * * * *